(No Model.) 2 Sheets—Sheet 1.
A. F. BOWEN.
BRIDLE.
No. 331,030. Patented Nov. 24, 1885.
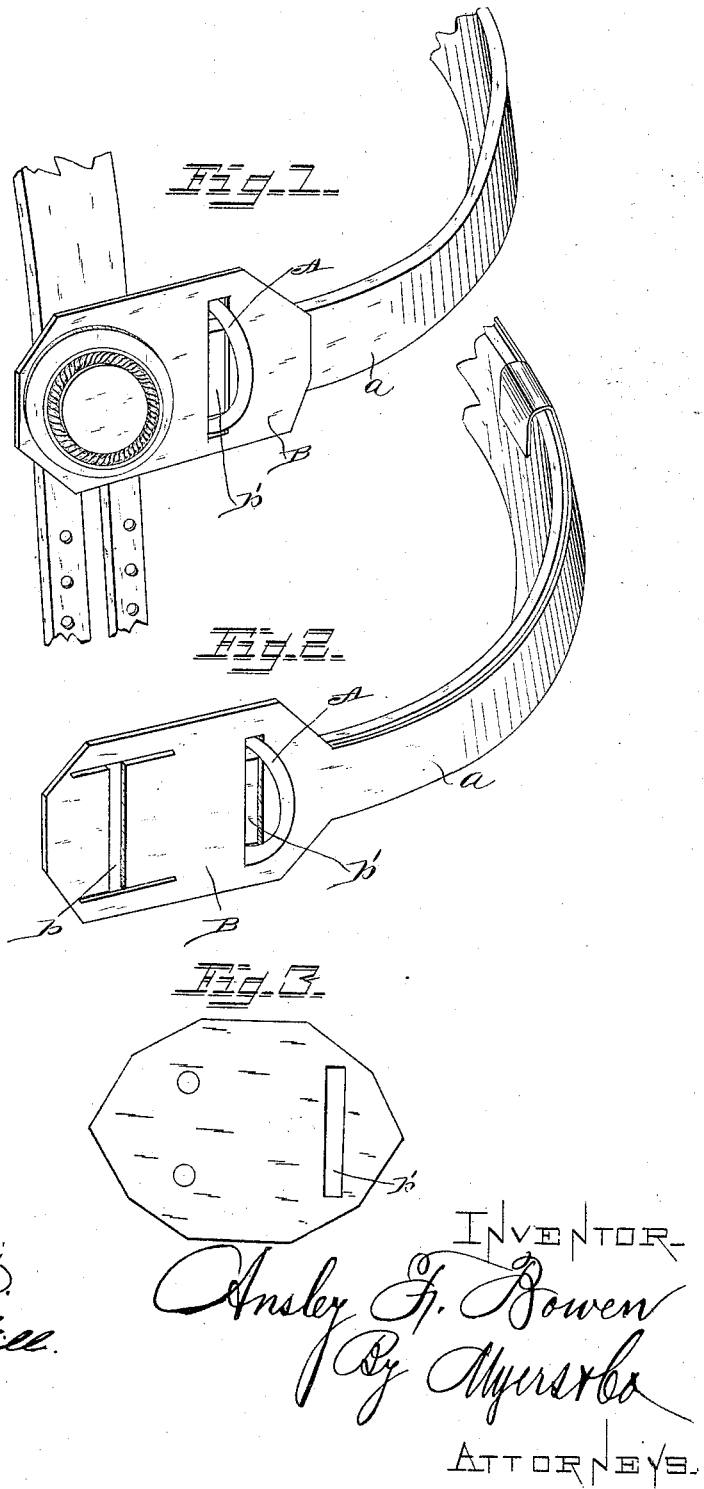
WITNESSES
Havard J. Schneider
L. Nolan McGill
INVENTOR
Ansley F. Bowen
By Myers & Co
ATTORNEYS (No Model.) 2 Sheets—Sheet 2.
A. F. BOWEN.
BRIDLE.
No. 331,030. Patented Nov. 24, 1885.
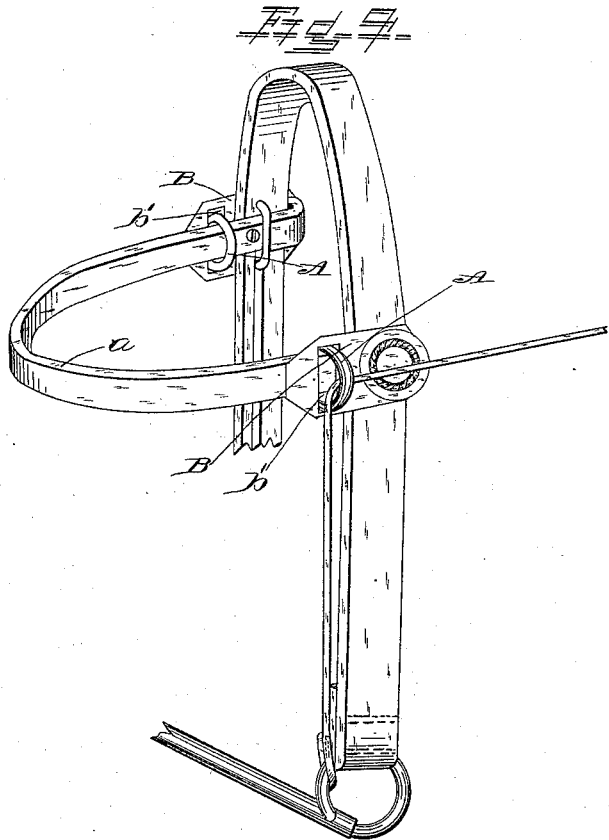

UNITED STATES PATENT OFFICE.

ANSLEY F. BOWEN, OF MAZEPPA, MINNESOTA.

BRIDLE.

SPECIFICATION forming part of Letters Patent No. 331,030, dated November 24, 1885.

Application filed September 4, 1885. Serial No. 176,146. (No model.)

*To all whom it may concern:*

Be it known that I, A. F. BOWEN, a citizen of the United States of America, residing at Mazeppa, in the county of Wabasha and State of Minnesota, have invented certain new and useful Improvements in Bridles, of which the following is a specification, reference being had therein to the accompanying drawings.

In this class of contrivances as heretofore constructed the overdraw check-rein is passed over the head of the horse or animal, which has been a cause of irritation to the horse's or animal's head, and a great source of annoyance to the driver or owner. These objections are overcome by my invention, the same consisting, principally, of combining with the frontispiece or forehead-strap the overdraw check-rein ring or rings, and of the peculiar means of attachment for the rings to the said strap, substantially as hereinafter more fully set forth, and pointed out in the claims.

In the accompanying drawings, Figure 1 is a front elevation of a portion of a bridle embodying my invention. Fig. 2 is a modification of the same, showing the plate which connects the overdraw check-rein to the rosette covering the frontispiece or forehead-strap upon the front side. Fig. 3 is a modified form of the rosette when used in lieu of the plates, and Fig. 4 is an enlarged view in perspective of my improved bridle, showing the overdraw check-rein in position.

In the embodiment of my invention I connect the overdraw check-rein rings A to or arrange them upon the frontispiece or forehead-strap *a* of the bridle instead of upon the head-strap as heretofore, and which former arrangement of the same has been a cause of irritation to the horse's or animal's head as well as a source of annoyance to the driver. In order to retain the said rings in place upon the frontispiece or forehead-strap *a*, I employ for each ring a plate, B, rectangularly slotted at *b b'*, interposed between the frontispiece and a rosette whose shank is passed through the slot *b* of the plate, thus securing the latter in position; or said slot *b* may be formed in the rosette itself, if made of sufficient size. (See Fig. 3.) The rings are each inserted into or through the slot *b'* of the plate B from the outside, while through the ring, upon the rear or inner side of the plate, is passed the forehead-strap or frontispiece, thus effecting the retention in place of the ring. The overdraw check-rein is thus permitted to be passed through said rings at the side of and so as to be out of contact with the horse's or animal's face and head, and thus prevent the irritation of the same, and avoid a great source of annoyance to the driver or owner, while the check-rein contrivance is equally if not more effective than the heretofore employed overdraw check-rein.

In the modification shown in Fig. 2, the plates, as it were, are lengthened and merged into a single piece, which wholly covers the forehead-strap or frontispiece upon its outside or front, the same being formed with a projection on its one edge, which is bent over and clamped upon the forehead-strap or frontispiece to more securely hold it thereon or prevent the strap slipping by or out of alignment therewith, and in said modification the slot *b* is extended a short distance on each side at either end to allow of different-sized rosettes being used.

Having thus fully described my invention, what I claim and desire to secure by Letters Patent, is—

1. In an overdraw check-rein, the ring arranged upon the forehead-strap or frontispiece of the bridle, in combination with a plate for holding it in place, through which also passes the shank of the rosette, substantially as and for the purpose set forth.

2. In an overdraw check-rein, the ring arranged upon the forehead-strap or frontispiece of the bridle, in combination with the plate having rectangular slots, through one of which slots the shank of a rosette is passed, and through the other slot is inserted the ring, through which ring also passes the frontispiece or forehead-strap, substantially as and for the purpose specified.

In testimony whereof I affix my signature in presence of two witnesses.

ANSLEY F. BOWEN.

Witnesses:
E. F. HOPKINS,
W. D. ANGELL.